(12) United States Patent
Tubach

(10) Patent No.: US 8,793,850 B2
(45) Date of Patent: Aug. 5, 2014

(54) METHOD FOR PRODUCING A TUBE WITH A BENT PROGRESSION AS A TRANSVERSE PROGRESSION

(75) Inventor: Hans Tubach, Straubenhardt (DE)

(73) Assignee: Witzenmann GmbH, Pforzheim (DE)

( * ) Notice: Subject to any disclaimer, the term of this patent is extended or adjusted under 35 U.S.C. 154(b) by 183 days.

(21) Appl. No.: 13/295,535

(22) Filed: Nov. 14, 2011

(65) Prior Publication Data

US 2012/0138185 A1 Jun. 7, 2012

Related U.S. Application Data

(63) Continuation-in-part of application No. 11/953,958, filed on Dec. 11, 2007, now abandoned.

(30) Foreign Application Priority Data

Dec. 11, 2006 (DE) .......................... 10 2006 058 218

(51) Int. Cl.
  *B21D 53/00* (2006.01)
  *B21D 53/08* (2006.01)
  *B21J 15/10* (2006.01)

(52) U.S. Cl.
  USPC ......... 29/34 R; 29/417; 29/525.14; 29/592.1; 72/55; 72/369; 138/177

(58) Field of Classification Search
  USPC .............. 29/417, 592.1, 525.14, 34 R; 72/55, 72/369; 138/177
  See application file for complete search history.

(56) References Cited

U.S. PATENT DOCUMENTS

| 113,614 | A | | 4/1871 | Austin et al. | |
|---|---|---|---|---|---|
| 1,066,223 | A | * | 7/1913 | Rendchen | 165/163 |
| 1,694,430 | A | | 12/1928 | Root | |
| 2,147,431 | A | | 2/1939 | Ewing | |
| 2,185,904 | A | | 1/1940 | Stowe | |
| 2,837,160 | A | | 6/1958 | Vera et al. | |
| 3,977,706 | A | | 8/1976 | Schneider | |
| 3,979,809 | A | | 9/1976 | Schneider | |
| 4,064,644 | A | * | 12/1977 | Warner et al. | 40/782 |
| 4,073,177 | A | * | 2/1978 | Leroux | 72/339 |

(Continued)

FOREIGN PATENT DOCUMENTS

| AU | 491529 | 3/1978 |
|---|---|---|
| DE | 907613 | 2/1954 |

(Continued)

*Primary Examiner* — Paul D Kim
(74) *Attorney, Agent, or Firm* — Volpe and Koenig, P.C.

(57) ABSTRACT

A method for producing a tube with a bent progression or with a bend embodied as a transverse progression. For bending the tube or for each fold of the transverse progression, two miter cuts are made into an essentially straight tube, thus creating two tube sections with miter cut surfaces extending along the cutting planes and a cutting wedge. The miter cuts are placed such that the cutting planes intersect at a point located inside the tube wall, and at this point a bendable bar is left intact connecting the two tube sections. The miter cuts are made such that the cutting wedge first remains in the tube via not-severed or incompletely severed holding points for tube transport. The cutting wedge is then removed and the miter cut surfaces of the two tube sections are folded onto each other around the bar which acts as a hinge and then allows both tube sections to be welded together all around their miter cut surfaces.

8 Claims, 3 Drawing Sheets

(56) References Cited

U.S. PATENT DOCUMENTS

| | | | |
|---|---|---|---|
| 4,704,838 A * | 11/1987 | Wendt | 52/658 |
| 5,644,883 A * | 7/1997 | Menchetti | 52/489.1 |
| 6,343,417 B1 | 2/2002 | Bonny et al. | |
| 6,471,251 B1 | 10/2002 | Yoshida et al. | |
| 7,418,806 B2 * | 9/2008 | Martineau et al. | 52/658 |

FOREIGN PATENT DOCUMENTS

| | | |
|---|---|---|
| DE | 3905788 | 8/1990 |
| DE | 20009269 | 11/2001 |
| FR | 2618364 | 1/1989 |
| GB | 2320215 | 6/1998 |
| JP | 2000356294 | 12/2000 |

* cited by examiner

METHOD FOR PRODUCING A TUBE WITH A BENT PROGRESSION AS A TRANSVERSE PROGRESSION

CROSS-REFERENCE TO RELATED APPLICATIONS

This application is a continuation-in-part of U.S. application Ser. No. 11/953,958, filed Dec. 11, 2007, now abandoned, which claims the benefit of DE 10 2006 058 218.7, filed Dec. 11, 2006, both of which are incorporated herein by reference as if fully set forth.

BACKGROUND

The invention relates to a method for producing a tube with a bent progression or with a bend embodied as a traverse progression as well as a preprocessed tube that can be used to produce a tube. The present invention particularly relates to a method and a preprocessed tube to produce such a tube made from metal.

Bent or curved metallic tubes are generally produced at first straight-lined and then the bends or curves are then implemented by processing the initially straight tube. This can occur at the facilities of the tube manufacturer or on site with the user. When relatively large bending radii are to be produced and the ratio of the diameter of the tube in reference to its wall thickness is not excessive the curves are usually created by bending the tube. The bending is limited, though, when very small bending radii are to be implemented to an intended folding of the tube, or when a thin-walled tube is bent having a large diameter. When several bends are to be created in a small space (aligned) in different spatial directions the bending of the tube is not practical, either.

Therefore, it is known alternatively to produce a bent section of the tube such that two miter cuts are inserted into the straight tube, creating two tube sections having miter cut surfaces extending along the faces of the cutting levels and a cutting wedge located therebetween, and after the removal of the cutting wedge the two tube sections are made to contact at their miter cut surfaces and welded together all around. A bend with a larger bending radius and/or bending angle can be produced in this manner by several slight folds in the form of a traverse progression.

Cutting out the cutting wedge by making two miter cuts, and the subsequent angular connection of the two thus produced tube sections with a following welding connection is more expensive than bending a tube, though. By cutting out the cutting wedge two separate tubes develop, which have to be carefully placed together and must be carefully aligned, particularly with regard to an axial distortion. In general, prior to welding the two tube sections together with a circular, water and air tight welding seam the tube sections carefully placed together and aligned must be preliminarily connected to each other via temporary welding spots, so that the alignment during the welding process is maintained. The alignment and particularly the placement of the welding spots can usually only be performed manually. When a bend is to be created having several transversely progressing folds placed adjacently, several individual tube sections develop, which renders the handling rather complicated and which may lead to mix-ups. The latter is of particular importance when no even bend in a single spatial direction is to be produced, but the folds of the transverse progression are aligned to different spatial directions, perhaps even with different bending radii.

SUMMARY

Based on this prior art the object of the present invention is to improve, with regard to handling and safety from errors as well as with regard to welding quality, the processing alternative for producing a tube with a bent progression or with a bend embodied as a transverse progression mentioned at the outset, in which by two miter cuts a cutting wedge is cut out and the two tube sections created thereby are placed together and welded to each other.

This object is attained in a method as well as a preprocessed tube according to the invention.

Preferred further embodiments of the method are disclosed in the specification and claims as are preferred embodiments of the preprocessed tube.

The core of the present invention therefore comprises that the miter cuts for cutting out the cutting wedge are placed such that the cutting levels intersect in a point located in the tube wall and at said point a bendable bar is left intact connecting the two tube sections. Therefore, the two tube sections are not separated entirely by the miter cuts but they remain connected via the bar left intact according to the invention. This bar is sufficiently thin that the two tube sections, after the removal of the cutting wedge, can be folded by a pivotal motion around the bar, acting as a hinge, towards each other until the two miter cut surfaces contact each other. On the other hand, the bar is sufficiently stable to prevent an unintended separation of the two tube sections and to exclude an axial rotation of the tube sections in reference to each other. Due to the fact that the tube sections can no longer be rotated in reference to each other, the necessity is omitted to align the tube sections in a time consuming fashion prior to welding. Due to the fact that a radial alignment of the two miter cut surfaces is additionally considerably facilitated because the bar fixes the two tube sections in reference to each other at one point of their circumference and thus a degree of freedom of alignment is eliminated, the temporary spot-welding of the aligned tube sections prior to welding can usually be omitted.

The preprocessed tube also provided within the scope of the present invention comprises at least two tube sections, which are connected to each other via a bendable bar left intact at the intersection of the cutting levels of the two miter cuts, so that the production of a fold or a bend on site becomes very easy with the delivered tube preprocessed according to the invention.

Particularly advantageous is a further development of the present invention in which at the point of the miter surfaces of the two respective tube sections spaced apart by a bar, when making the miter cuts, a protrusion is inserted into the miter cut surface of one of the two tube sections and a recess into the miter cut surface of the other tube section as a form-fitting counterpart to the protrusion. When the miter cuts are made via laser radiation, water jets, or by plasma cutting, protrusions and recesses can very easily be created by a respectively computer-controlled cutting. With this further development of the invention, temporary spot-welding to align the tube sections prior to welding becomes entirely unnecessary, because the centering by the protrusion and the recess eliminates the risk that the bar according to the invention is simultaneously twisted when the tube sections are folded onto each other. The combination of the bar with the centering features of the protrusion and the recess precisely defines the position of the tube sections so that when the protrusion is fitted into the recess, an exact alignment of the tube sections with precisely contacting miter cut surfaces develops automatically and the tube sections can be easily welded together.

It is preferred but not mandatory for the protrusion and the recess to be entered into the miter cut surfaces of the two tube sections as centering aids approximately diametrically opposite the bar. The farther apart the two centering aids and the bar the better, and the more precise the automatic alignment of the two tube sections in reference to each other.

The protrusion can be embodied as a triangular or rounded pin, with then the recess serving as the form-fitting counterpart being a triangular or groove-shaped notch. This embodiment of the centering aid facilitates the centering, in particular when the bar is relatively instable and the tube sections have a very thin wall and/or the diameter of the tube is very large.

The diagonal sides of the triangular or rounded pin as well as the respective counterparts in the recess serve as introducing bevel.

Further advantages develop when the miter cuts are set such that not only the bar according to the invention remains standing but the separation between the cutting wedge and the two tube sections occurs incomplete at one or more points so that the cutting wedge at one or more holding points is held in the form of well-positioned miniature material bars, initially remaining in the tube and later being removed by way of hitting them. This allows the transportation of a preprocessed tube, into which the miter cuts have already been made, for further processing. Of course, this is then particularly advantageous when the further processing occurs on site with the user. However, it is also advantageous for the manufacturer, when the cutting wedge is only removed directly prior to the welding stations. This reduces the risk that the two tube sections, still connected by the so-called bending bar, can be disadvantageously rotated around the bar such that the bar breaks or is disadvantageously deformed. By the cutting wedge remaining in the cut out, the cut tube continues to retain its axial stability. This allows cutting several wedge-shaped cuts arranged successively over the axial direction.

Within the scope of the present invention several miter cuts can be made in a tube in order to achieve a bent tubular progression in one or more spatial directions. Using this further development of the invention, a potentially great advantage of the invention is achieved. As mentioned at the outset, according to prior art it has not been possible without expensive marking of the parts to enter several serial folds in a tube, at least when the folds were to be produced in different spatial directions or with different bending angles. In the conventional total separation of the straight tube by miter cuts, all tube sections are provided individually and must be puzzled together by the user. This is different in the present invention: due to the fact that all tube sections remain connected via the bar according to the invention they stay in their intended spatial alignment and sequence so that even complicated bending processes can be produced by a simple folding together of the respective tube sections and welding connection of the miter cut surfaces contacting each other.

The method according to the invention is subsequently preferably performed in a linked, automatic process, particularly using robots. First the miter cuts are made in the essentially straight tube and, after a folding together of the tube sections developing here, the miter surfaces are welded to each other. As described above, the intermediate step is omitted, in which the tube sections must be carefully aligned and spot welded in order to then be welded.

The predominantly automatic production (mass production) can therefore occur in two phases.

First the cut is inserted, maintaining the straight tubular shape with sufficient axial stability and torque resistance. For the automatic production, sufficient axial stability and torque carrying ability must be ensured during the cutting process, particularly when a sequence of tube sections is produced and appropriately longer source tubes are used. This is only possible by the temporary remainder of the cutting wedges and their fixation via miniature material bars (fixing bars). Additionally, in this way the final processing of the already cut tubes, for example by way of welding, can occur at different locations, because the precut arrangements can be transported similar to stiff tubes without losing the geometric allocation of the individual linked tube sections.

Then the final production of the bends occurs, namely by a segmental separation of the stiff connections (removal of wedges), folding of the sometimes differently aligned tube sections onto each other, and welding together along the contact surfaces of adjacent tube sections.

BRIEF DESCRIPTION OF THE DRAWINGS

An exemplary embodiment of a preprocessed tube is described in greater detail and explained using the attached drawing. It shows.

DETAILED DESCRIPTION OF THE PREFERRED EMBODIMENT

Figure 1:
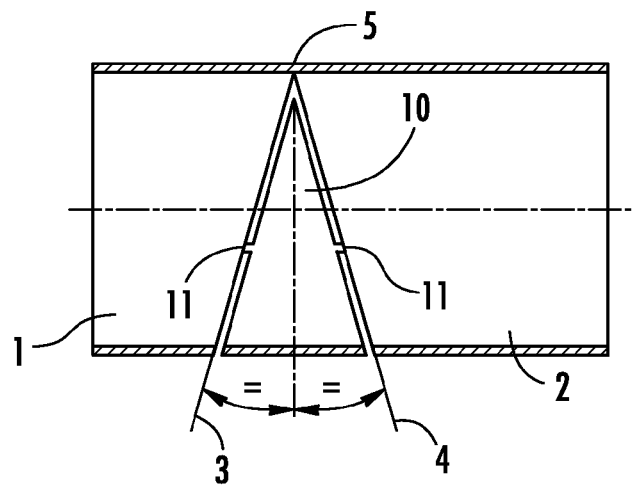
FIG. 1 is a lateral cross-sectional view of a preprocessed tube according to the invention shown with the cutting wedge in position.

The preprocessed tube shown in a cross-section in FIG. 1 comprises a first tube section 1 and a second tube section 2, which are separated by two miter cuts in the cutting planes 3 and 4. The cutting planes 3 and 4 intersect inside the tube wall at the intersection of the first tube section 1 and the second tube section 2, and when placing the miter cuts here a bar 5 is left intact, which connects the two tube sections 1 and 2, shown in detail in FIG. 3X. The cutting wedge 10 is also left intact, held in position by knock-out holding points 11 that have not been fully cut through.

Figure 2:
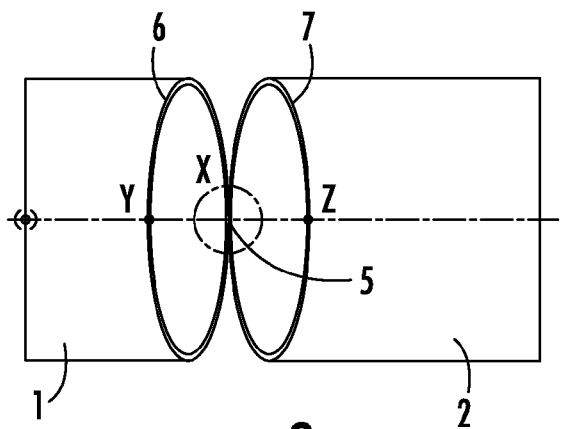
FIG. 2 a top view of the preprocessed tube according to FIG. 1 with the cutting wedge knocked-out.

As is discernible from the top view according to FIG. 2 where the cutting wedge 10 has been knocked-out by breaking the holding points 11, at the perimeter of the tube sections 1 and 2, diametrically opposite in reference to the bar 5, centering aids are inserted into a first miter cut surface 6 of the first tube section 1 and into a second miter cut surface 7 of the second tube section 2.

Figure 3X:
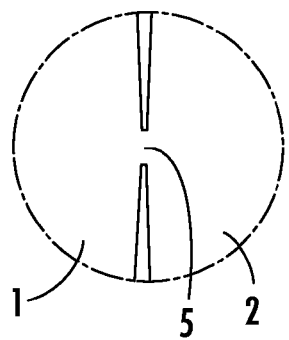
FIGS. 3X, 3Y and 3Z show the details X, Y, and Z of FIG. 2.
Figure 3Y:
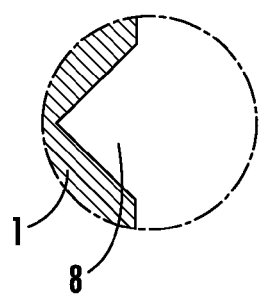
Figure 3Z:
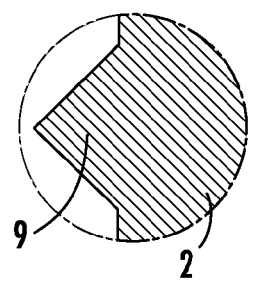

These centering aids are shown in greater detail in FIGS. 3Y and 3Z. FIG. 3Y shows the centering aid in a first miter cut surface 6 at the first tube section 1. It relates to a recess in the form of a groove-shaped notch 8. The counterpart thereto is shown in FIG. 3Z, which shows the centering aid at the second miter cut surface 7 of the second tube section 2. It relates here to a protrusion embodied as a rounded pin 9, which can be inserted in a form-fitting manner into the notch 8.

The notch 8 and the pin 9 cooperate with the bar 5, shown in an enlargement in FIG. 3X, connecting the first tube section 1 to the second tube section 2 such that, as discernible in FIG. 2, the two tube sections 1 and 2, which remain anyways in their alignment in reference to each other because they are connected at the bar 5, must be folded together such that the first miter cut surface 6 and the second miter cut surface 7 contact each other in order to prepare the welding and to precisely align the tube sections 1 and 2 in reference to each other. While the bar 5 here serves as a hinge and/or link by way of bending when the tube sections 1 and 2 are folded the notch 8 and the pin 9 ensure a precise centering in case of any potentially occurring rotation of the tube sections 1 and 2 through not only bending but also twisting of the bar 5. When the bar 5 is not severed and simultaneously the pin 9 is inserted in a form-fitting manner into the notch 8, the miter cut surfaces 6 and 7 are automatically precisely aligned to each other so that the welding together of the two tube sections 1 and 2 can occur without any temporary spot-welding and without any time consuming centering process.

FIGS. 4-8 show a second embodiment of a preprocessed tube 20 with a folded progression bend, similar to the embodiment of FIGS. 1 and 2. Here the tube 20 has first, second, third and fourth tube sections 21-24, although fewer or more sections could be provided. The tube sections are 21-24 are separated from the adjacent sections by pairs of miter cuts in cutting planes as shown in detail in FIGS. 4 and 5. Here the first and second sections 21 and 22 are separated by miter cuts, each at an angle $\alpha_1$ while leaving a bendable bar 25, similar to the bendable bar 5 described above. A notch 26 and pin 27 are preferably also formed in the respective ends of the first and second tube sections 21, 22 in a similar manner to the notch 8 and pin 9 described above. While not necessary, optionally a cutting wedge 28 (shown in phantom lines) can be left in place connected by holding points 29, and the cutting wedge 28 can be knocked-out at a different location so that the tube can be transported with more stability and without the risk of unwanted bending prior to the first and second tube sections being bent together about the bendable bar 25 and welded together.

Figure 4:
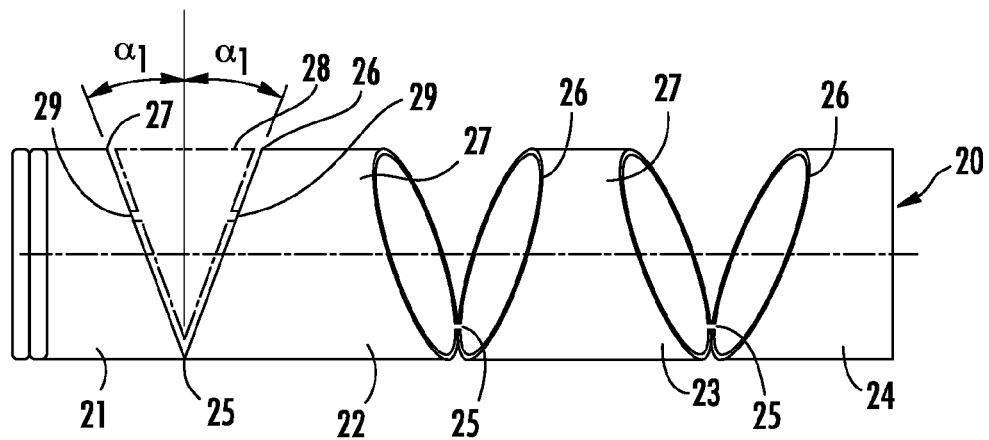
FIG. 4 is a lateral view of a preprocessed tube according to a second embodiment of the invention.
Figure 5:
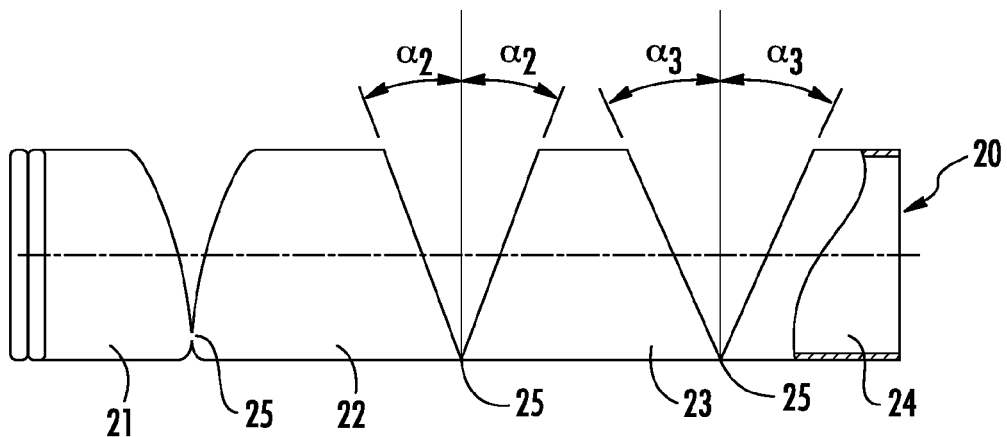
FIG. 5 is a lateral view similar to FIG. 4, wherein the tube has been rotated about its longitudinal axis to illustrate the position of additional miter cuts.

As shown by a comparison of FIGS. 4 and 5, the miter cuts at angle $\alpha_2$ between the second tube section 22 and the third tube section 23 are made so that the bendable bar connecting these two tube sections is rotated, for example here 41° about the longitudinal axis of the tube relative to the position of the bendable bar 25 between the first and second tube sections 21, 22. The miter cuts at angle $\alpha_3$ between the third tube section 23 and the fourth tube section 24 are made so that the bendable bar connecting these two tube sections is aligned with the bendable bar 25 between the second and third tube sections 22, 23. A notch 26 and pin 27 are preferably also formed in the respective ends of the second and third tube sections 22, 23, as well as at the ends of the third and fourth tube sections 23, 24 to be joined in order to provide an alignment and centering feature, as discussed above. The cutting wedges are not shown in these miter cuts, but could optionally be left to provide stability for transport.

Figure 6:
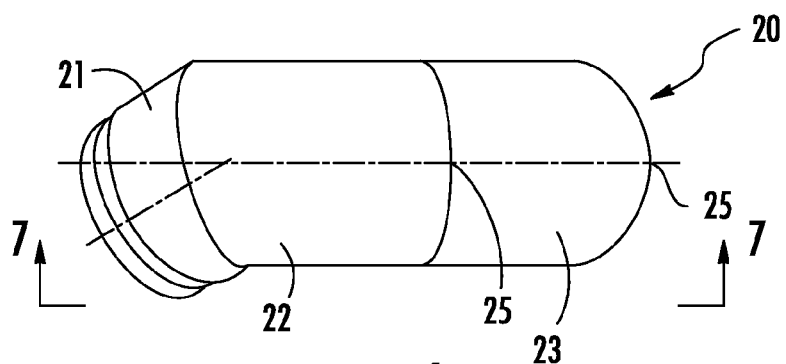
FIG. 6 is a view of the assembled tube.
Figure 7:
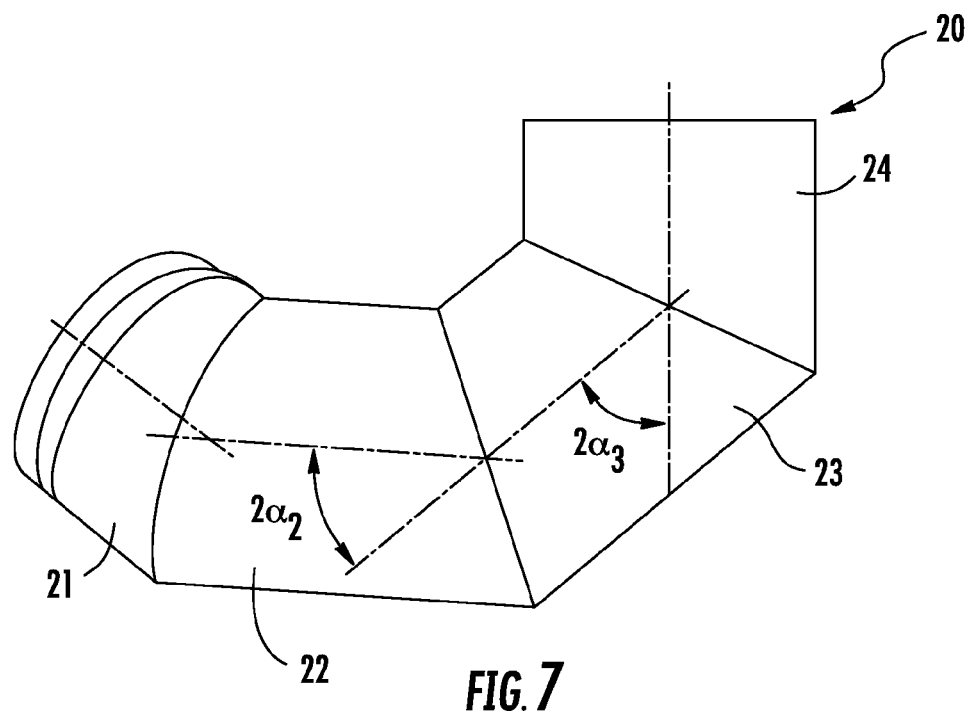
FIG. 7 is a view of the assembled tube taken along line 7-7 in FIG. 6.
Figure 8:
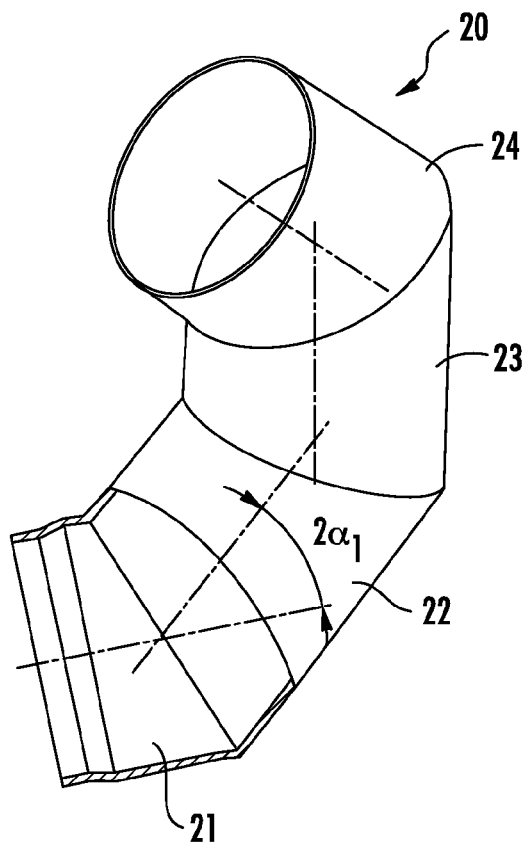
FIG. 8 is a perspective view of the assembled tube of FIGS. 6 and 7 showing that the tube sections extend in multiple spatial directions.

Referring to FIGS. 6-8, when the preprocessed tube 20 is assembled, due to the rotation about the longitudinal axis of the location of the bendable bar 25 between the first and second tube sections 21, 22 relative to the locations of the bendable bars 25 between the second and third tube sections 22, 23 as well as the third and fourth tube sections 23, 24, the bends of the assembled tube 20 extend in several spatial directions so that the axes of each of the tube sections 21-24 do not lie in a common plane. These directions can be precisely manufactured based on the positions of the bendable bars 25, the angles $\alpha_1$, $\alpha_2$, $\alpha_3$ as well as the notches 26 and pins 27 at the ends of the tube sections 21-24 to be joined. As shown in FIGS. 7 and 8, the final angles of the axes of the separate tube sections 21-24 relative to the adjacent tube section are two times the respective miter angle $\alpha_1$, $\alpha_2$, $\alpha_3$. If the cutting wedges 28 are left intact for transport or storage, these can be knocked-out at the time the preprocessed tube 20 is to be assembled. Alternatively, the cutting wedges 28 can be initially removed, and only the single bendable bar 25 is left connecting each of the tube sections 21-24 to the next adjacent tube section until the bent-together ends of the tube sections 21-24 are welded together.

The invention claimed is:

1. A method for producing a tube with a folded progression of a bend formed as a transverse progression, comprising: making two miter cuts at a first position of a straight tube to be folded or for each fold of the transverse progression, resulting in two tube sections with miter cut surfaces extending along faces of cutting planes and a cutting wedge, the miter cuts are placed such that the cutting planes intersect at a point located inside the tube wall and at this point a bendable bar is left intact connecting the two tube sections, wherein the miter cuts are made such that the cutting wedge first remains in the tube for tube transport via not-severed or incompletely severed holding points that are spaced apart from the bendable bar; after tube transport, removing the cutting wedge from the two tube sections; bending the miter cut surfaces to each other at the miter cut surfaces; and connecting the miter cut surfaces to one another by welding around.

2. The method according to claim 1, further comprising, at a location of the miter cut surfaces of the two respective tube sections spaced apart from the bar, when making the miter cut making at least one protrusion at the miter cut surface of one of the two tube sections and making at least one recess as a form-fitting counterpart of the protrusion into the miter cut surface of the other of the tube sections.

3. The method according to claim 2, wherein the protrusion and the recess are provided at the miter cut surfaces of the two tube sections at a position approximately diametrically opposite to the bar.

4. The method according to claim 2, wherein the protrusion comprises a triangular or rounded pin and the recess comprises a triangular or groove-shaped notch.

5. The method according to claim 1, further comprising producing the miter cuts via laser radiation, via water jets, or by plasma cutting.

6. The method according to claim 1, wherein a plurality of the miter cuts are made in the tube in order to achieve a tube progression bent in one or more spatial directions.

7. The method according to claim 6, wherein a placement of the miter cuts and the welding of the miter cut surfaces to each other occur in a linked automatic process.

8. A method for producing a tube with a folded progression of a bend formed as a transverse progression, comprising: making two miter cuts at a first position of a straight tube to be folded and making two miter cuts at a second position of a straight tube for a subsequent fold of the transverse progression, resulting in first, second and third tube sections with miter cut surfaces extending along faces of cutting planes and a cutting wedge, the miter cuts are placed such that the cutting planes intersect at a point located inside the tube wall and at this point a bendable bar is left intact connecting the first and second tube sections as well as the second and third tube sections, with the bendable bars being offset in a peripheral direction about a longitudinal axis of the tube; bending the miter cut surfaces to each other at the miter cut surfaces; and connecting the miter cut surfaces to one another by welding around, wherein the tube is bent in at least two multiple spatial directions.

\* \* \* \* \*